United States Patent [19]

Bishop et al.

[11] Patent Number: 5,679,138
[45] Date of Patent: Oct. 21, 1997

[54] INK JET INKS CONTAINING NANOPARTICLES OF ORGANIC PIGMENTS

[75] Inventors: John F. Bishop, Rochester; David Alan Czekai, Honeoye Falls, both of N.Y.

[73] Assignee: Eastman Kodak Company, Rochester, N.Y.

[21] Appl. No.: 565,270

[22] Filed: Nov. 30, 1995

[51] Int. Cl.$^6$ .................................... C09D 11/02
[52] U.S. Cl. ........................ 106/20 C; 106/20 D
[58] Field of Search ................ 106/20 C, 20 D, 106/23 C

[56] References Cited

U.S. PATENT DOCUMENTS

| | | | |
|---|---|---|---|
| 4,427,810 | 1/1984 | Chisvette et al. | 106/20 C |
| 4,522,654 | 6/1985 | Chisvette et al. | 106/20 C |
| 4,597,794 | 7/1986 | Ohta et al. | 106/20 R |
| 5,026,427 | 6/1991 | Mitchell et al. | 106/23 R |
| 5,085,698 | 2/1992 | Ma et al. | 106/20 R |
| 5,145,684 | 9/1992 | Liversidge et al. | 424/489 |
| 5,310,778 | 5/1994 | Shor et al. | 524/556 |
| 5,443,628 | 8/1995 | Loria et al. | 106/20 C |
| 5,478,705 | 12/1995 | Czekai et al. | 430/449 |
| 5,538,548 | 7/1996 | Yamazaki | 106/20 C |
| 5,538,549 | 7/1996 | Kato et al. | 106/20 C |

*Primary Examiner*—Helene Klemanski
*Attorney, Agent, or Firm*—John R. Everett

[57] ABSTRACT

A process for making ink jet inks, comprising the steps of:

(A) providing an organic pigment dispersion containing a pigment, a carrier for the pigment and a dispersant;

(B) mixing the pigment dispersion with rigid milling media having an average particle size less than 100 μm;

(C) introducing the mixture of step (B) into a high speed mill;

(D) milling the mixture from step (C) until a pigment particle size distribution is obtained wherein 90% by weight of the pigment particles have a size less than 100 nanometers (nm);

(E) separating the milling media from the mixture milled in step (D); and (F) diluting the mixture from step (E) to obtain an ink jet ink having a pigment concentration suitable for ink jet printers.

15 Claims, No Drawings

INK JET INKS CONTAINING NANOPARTICLES OF ORGANIC PIGMENTS

FIELD OF THE INVENTION

This invention relates to the field of ink jet printing.

BACKGROUND OF THE INVENTION

Ink jet printing is a non-impact method for producing images by the deposition of ink droplets on a substrate (paper, transparent film, fabric, etc.) in response to digital signals. Ink jet printers have found broad applications across markets ranging from industrial labeling to short run printing to desktop document and pictorial imaging. The inks used in ink jet printers are generally classified as either dye-based or pigment-based.

A dye is a colorant which is molecularly dispersed or solvated by a carrier. The carrier can be a liquid or a solid at room temperature. A commonly used carrier is water or a mixture of water and organic co-solvents. Each individual dye molecule is surrounded by molecules of the carrier. In dye-based inks, no particles are observable under the microscope. Although there have been many recent advances in the art of dye-based ink jet inks, such inks still suffer from deficiencies such as low optical densities on plain paper and poor lightfastness. When water is used as the carrier, such inks also generally suffer from poor water fastness.

Pigment based inks have been gaining in popularity as a means of addressing these limitations. In pigment-based inks, the colorant exists as discrete particles. These pigment particles are usually treated with addenda known as dispersants or stabilizers which serve to keep the pigment particles from agglomerating and settling out of the carrier. Pigment-based inks suffer from a different set of deficiencies than dye-based inks. These deficiencies are the result of the fact that prior-art pigment-based inks display particle sizes and particle size distributions which may vary widely from pigment to pigment. This often requires costly and time-consuming filtration steps and often leads to plugging of the orifices of ink jet printer. This dramatically limits the number of available pigments which can be used in ink jet printing processes. For example, although pigments in a wide variety of colors have been described in the prior art, commercially available ink jet inks have thus far been limited to black inks based on carbon black.

U.S. Pat. No. 5,026,427 (Mitchell and Trout) describes a process for the preparation of pigmented ink jet inks having particle sizes of from 600 to 1300 nm. U.S. Pat. No. 5,085,698 (Ma, Matrick, Shor, and Spinelli) describes pigmented ink jet inks comprising average particle sizes ranging from 107 to 205 nm. U.S. Pat. No. 5,310,778 (A. Shor and H. Spinelli) describes a dispersion process method for preparing pigmented ink jet inks having average particles sizes of 100 and 157 nm. U.S. Pat. No. 4,597,794 (Ohta, et al.) describes a process where a pigmented ink jet ink is prepared and subsequently centrifuged to remove particles larger than 1 μm.

A common deficiency of most prior art milling processes is that they fail to reduce the pigment particle size below the primary particle size of the pigment as supplied from the manufacturer. Pigment particles are supplied as agglomerated powders or wet filter cakes. The process of preparing inks from pigments commonly involves two steps: (a) a dispersing or milling step to break up the pigment to the primary particle, and (b) dilution step in which the dispersed pigment concentrate is diluted with a carrier and other addenda to a working strength ink. In the milling step, the pigment is usually suspended in a carrier (typically the same carrier as that in the finished ink) along with rigid, inert milling media. In conventional prior-art processes the milling media is generally limited to diameters larger than about 300 μm. Mechanical energy is supplied to this pigment dispersion, and the collisions between the milling media and the pigment cause the pigment to deaggregate into its primary particles. A dispersant or stabilizer, or both, is commonly added to the pigment dispersion to facilitate the deaggregation of the raw pigment, to maintain colloidal particle stability, and to retard particle reagglomeration and settling.

The mean particle size of the pigment after milling as described above is usually greater than about 100 nm (0.1 μm). Furthermore, the particle size distribution is often relatively broad, and particle shapes can range from roughly spherical to highly aspherical, needle-like particles. The combination of relatively large mean particle sizes, broad distributions, and irregular shapes often leads to problems with plugging of the ink jet orifices, either partially or completely, with a few of the larger, irregularly shaped particles. Although this drawback may be overcome by filtration, centrifugation, or other means, this adds to the complexity, cost, and amount of time needed to manufacture the ink. Even in those cases where larger, aspherical particles are removed or avoided, these inks suffer from diminished transparency due to scattering of light by particles greater than about 100 nm. This in turn results in poor quality projected color images, and reduced color gamut due to adverse interactions which arise when the primary colors of cyan, magenta, and yellow are mixed to produce secondary colors.

SUMMARY OF THE INVENTION

The present invention provides a process for making ink jet inks, comprising the steps of:

(A) providing an organic pigment dispersion containing a pigment, a carrier for the pigment and a dispersant;

(B) mixing the pigment dispersion with rigid milling media having an average particle size less than 100 μm;

(C) introducing the mixture of step (B) into a high speed mill;

(D) milling the mixture from step (C) until a pigment particle size distribution is obtained wherein 90% by weight of the pigment particles have a size less than 100 nanometers (nm);

(E) separating the milling media from the mixture milled in step (D); and (F) diluting the mixture from step (E) to obtain an ink jet ink having a pigment concentration suitable for ink jet printers.

This invention solves, or greatly minimizes the prior art problems referred to above. A simpler, less time-consuming and less expensive process is provided that produces ink jet inks containing smaller pigment particles and narrower particle size distributions than provided in prior art ink jet inks. The inks exhibit greatly improved performance and greatly reduced elemental contamination when compared to pigment-based inks prepared by prior-art methods. It was particularly surprising such fine particles could be prepared significantly free of contamination compared to prior art ink jet inks. Images produced from these inks exhibit expanded color gamut, a high degree of image transparency, and reduced image cracking in areas of high ink lay down. The inks are easy to filter, display excellent shelf-life, and are less prone to printhead plugging. These inks have been successfully incorporated with the other necessary ink ingredients and successfully printed using a thermal drop-on-demand ink jet printer.

DETAILED DESCRIPTION

In the present invention ink jet ink pigment dispersions with an average particle size of less than 100 nm are prepared. Using polymeric milling media having an average particle size of less than 100 µm, preferably 50 µm, 90% by weight of the pigments are milled to a particle size of less than 100 nm. Indeed excellent particle size reduction has been achieved with media having a particle size of about 5 µm.

Indeed in a useful embodiment of the process of the invention step (D) is carried out until 90% by weight of pigments in the mixture are milled until they have a particle size less than 50 nm. In a particularly useful embodiment step (D) is carried out until 10% by weight of the pigments in the mixture have a particle size less than 15 nm; 50% by weight of said pigment have a particle size less than 25 nm and 90% by weight of said pigments have a particle size less than 50 nm.

There are many different types of materials which may be used as milling media, such as glasses, ceramics, metals, and plastics. In a preferred embodiment, the grinding media can comprise particles, preferably substantially spherical in shape, e.g., beads, consisting essentially of a polymeric resin.

In general, polymeric resins suitable for use herein are chemically and physically inert, substantially free of metals, solvent and monomers, and of sufficient hardness and friability to enable them to avoid being chipped or crushed during milling. Suitable polymeric resins include crosslinked polystyrenes, such as polystyrene crosslinked with divinylbenzene, styrene copolymers, polyacrylates such as poly(methyl methylacrylate), polycarbonates, polyacetals, such as Derlin™, vinyl chloride polymers and copolymers, polyurethanes, polyamides, poly (tetrafluoroethylenes), e.g., Teflon™, and other fluoropolymers, high density polyethylenes, polypropylenes, cellulose ethers and esters such as cellulose acetate, poly(hydroxyethylmethacrylate), poly (hydroxyethyl acrylate), silicone containing polymers such as polysiloxanes and the like. The polymer can be biodegradable. Exemplary biodegradable polymers include poly (lactides), poly(glycolids) copolymers of lactides and glycolide, polyanhydrides, poly(imino carbonates), poly(N-acylhydroxyproline) esters, poly(N-palmitoyl hydroxyprolino) esters, ethylene-vinyl acetate copolymers, poly(orthoesters), poly(caprolactones), and poly (phosphazenes). The polymeric resin can have a density from 0.9 to 3.0 g/cm$^3$. Higher density resins are preferred inasmuch as it is believed that these provide more efficient particle size reduction. Most preferred are crosslinked or uncrosslinked polymeric media based on styrene.

Milling takes place in a high speed mill. By high speed mill we mean milling devices capable of accelerating milling media to velocities greater than about 5 meters per second. The mill can contain a rotating shaft with one or more impellers. In such a mill the velocity imparted to the media is approximately equal to the peripheral velocity of the impeller, which is the product of the impeller revolutions per minute, π, and the impeller diameter. Sufficient milling media velocity is achieved, for example, in Cowles-type saw tooth impeller having a diameter of 40 mm when operated at 9,000 rpm. The preferred proportions of the milling media, the pigment, the liquid dispersion medium and dispersant can vary within wide limits and depends, for example, upon the particular material selected and the size and density of the milling media etc. The process can be carried out in a continuous, batch or semi-batch mode.

Batch Milling

A slurry of <100 µm milling media, liquid, pigment and dispersant is prepared using simple mixing. This slurry may be milled in conventional high energy batch milling processes such as high speed attritor mills, vibratory mills, ball mills, etc. This slurry is milled for a predetermined length of time to allow comminution of the active material to a minimum particle size. After milling is complete, the dispersion of active material is separated from the grinding media by a simple sieving or filtration.

Continuous Media Recirculation Milling

A slurry of <100 µm milling media, liquid, pigment and dispersant may be continuously recirculated from a holding vessel through a conventional media mill which has a media separator screen adjusted to >100 µm to allow free passage of the media throughout the circuit. After milling is complete, the dispersion of active material is separated from the grinding media by simple sieving or filtration.

Mixed Media Milling

A slurry of <100 µm milling media, liquid, pigment and dispersant as indicated above may be continuously recirculated from a holding vessel through a conventional media mill containing milling media >250 µm. This mill should have a screen separator to retain the large media in the milling chamber while allowing passage of the small media through the milling chamber. After milling is complete, the dispersion of active material is separated from the grinding media by simple sieving or filtration.

After milling is completed, the milling media is separated from the milled particulate product (in either a dry or liquid dispersion form) using conventional separation techniques, such as by filtration, sieving through a mesh screen, and the like.

The preferred amounts and ratios of the ingredients of the mill grind will vary widely depending upon the specific materials and the intended applications. The contents of the milling mixture comprise the mill grind and the milling media. The mill grind comprises pigment, dispersant and a liquid carrier such as water. For aqueous ink jet inks, the pigment is usually present in the mill grind at 1 to 50 weight %, excluding the milling media. The weight ratio of pigment to dispersant is 20:1 to 1:2. The high speed mill is a high agitation device, such as those manufactured by Morehouse-Cowles, Hockmeyer et al.

The milling time can vary widely and depends upon the pigment, mechanical means and residence conditions selected, the initial and desired final particle size, etc. For aqueous mill grinds using the preferred pigments, dispersants, and milling media described above, milling times will typically range from 1 to 100 hours. The milled pigment concentrate is preferably separated from the milling media by filtration.

In the present invention, any of the known organic pigments can be used. Pigments can be selected from those disclosed, for example, in U.S. Pat. Nos. 5,026,427; 5,085, 698; 5,141,556; 5,160,370 and 5,169,436. The exact choice of pigment will depend upon the specific color reproduction and image stability requirements of the printer and application. For four-color printers combination of cyan, magenta, yellow, and black (CMYK) pigments should be used. An exemplary four color set may be copper phthalocyanine (pigment blue 15), quinacridone magenta (pigment red 122), paliotol Yellow D0960HD (pigment yellow 138) and carbon black (pigment black 7).

The aqueous carrier medium is water or a mixture of water and at least one water soluble co-solvent. Selection of a suitable mixture depends on requirements of the specific application, such as desired surface tension and viscosity, the selected pigment, drying time of the pigmented ink jet ink, and the type of paper onto which the ink will be printed. Representative examples of water-soluble co-solvents that may be selected include (1) alcohols, such as methyl alcohol, ethyl alcohol, n-propy alcohol, isopropyl alcohol, n-butyl alcohol, sec-butyl alcohol, t-butyl alcohol, iso-butyl alcohol, furfuryl alcohol, and tetrahydrofurfuryl alcohol; (2) ketones or ketoalcohols such as acetone, methyl ethyl ketone and diacetone alcohol; (3) ethers, such as tetrahydrofuran and dioxane; (4) esters, such as ethyl acetate, ethyl lactate, ethylene carbonate and propylene carbonate; (5) polyhydric alcohols, such as ethylene glycol, diethylene glycol, triethylene glycol, propylene glycol, tetraethylene glycol, polyethylene glycol, glycerol, 2-methyl-2,4-pentanediol 1,2,6-hexanetriol and thioglycol; (6) lower alkyl mono- or di-ethers derived from alkylene glycols, such as ethylene glycol mono-methyl (or -ethyl) ether, diethylene glycol mono-methyl (or -ethyl) ether, propylene glycol mono-methyl (or -ethyl) ether, triethylene glycol mono-methyl (or -ethyl) ether and diethylene glycol di-methyl (or -ethyl) ether; (7) nitrogen containing cyclic compounds, such as pyrrolidone, N-methyl-2-pyrrolidone, and 1,3-dimethyl-2-imidazolidinone; and (8) sulfur-containing compounds such as dimethyl sulfoxide and tetramethylene sulfone.

The dispersant is another important ingredient in the mill grind. Preferred dispersants for aqueous ink jet inks include sodium dodecyl sulfate, acrylic and styrene-acrylic copolymers, such as those disclosed in U.S. Pat. Nos. 5,085,698 and 5,172,133, and sulfonated polyesters and styrenics, such as those disclosed in U.S. Pat. No. 4,597,794. Other patents referred to above in connection with pigment availability also disclose a wide variety of dispersant to select from. The dispersant used in the examples is sodium N-methyl-N-oleoyl taurate (OMT).

Ink Preparation

In general it is desirable to make the pigmented ink jet ink in the form of a concentrated mill grind, which is subsequently diluted to the appropriate concentration for use in the ink jet printing system. This technique permits preparation of a greater quantity of pigmented ink from the equipment. If the mill grind was made in a solvent, it is diluted with water and optionally other solvents to the appropriate concentration. If it was made in water, it is diluted with either additional water or water miscible solvents to make a mill grind of the desired concentration. By dilution, the ink is adjusted to the desired viscosity, color, hue, saturation density, and print area coverage for the particular application.

In the case of organic pigments, the ink may contain up to approximately 30% pigment by weight, but will generally be in the range of approximately 0.1 to 10%, preferably approximately 0.1 to 5%, by weight of the total ink composition for most thermal ink jet printing applications. The amount of aqueous carrier medium is in the range of approximately 70 to 99.8 weight %, preferably approximately 90 to 99.8 weight %, based on the total weight of the ink. A mixture of water and a polyhydric alcohol, such as diethylene glycol, is preferred as the aqueous carrier medium. In the case of a mixture of water and diethylene glycol, the aqueous carrier medium usually contains from about 30% water/70% diethylene glycol to about 95% water/5% diethylene glycol. The preferred ratios are approximately 60% water/40% diethylene glycol to about 95% water/5% diethylene glycol. Percentages are based on the total weight of the aqueous carrier medium.

Jet velocity, separation length of the droplets, drop size and stream stability are greatly affected by the surface tension and the viscosity of the ink. Pigmented ink jet inks suitable for use with ink jet printing systems should have, a pH in the range of 5 to 9, a surface tension in the range of about 20 dynes/cm to about 70 dynes/cm and, more preferably, in the range 30 dynes/cm to about 50 dynes/cm. Control of surface tensions in aqueous inks is accomplished by additions of small amounts of surfactants. The level of surfactants to be used can be determined through simple trial and error experiments. Anionic and cationic surfactants may be selected from those disclosed in U.S. Pat. Nos. 5,324,349; 4,156,616 and 5,279,654 as well as many other surfactants known in the ink jet ink art. Commercial surfactants include the Surfynols® from Air Products; the Zonyls® from DuPont and the Fluorads® from 3M.

Acceptable viscosities are no greater than 20 centipoise, and preferably in the range of about 1.0 to about 10.0, preferably 1.0 to 5.0 centipoise at room temperature.

Inks according to this invention have a total trace metal contamination concentration of less than 100 parts per million of ink containing 2.5% by weight of pigment.

The ink has physical properties compatible with a wide range of ejecting conditions, i.e., driving voltages and pulse widths for thermal ink jet printing devices, driving frequencies of the piezo element for either a drop-on-demand device or a continuous device, and the shape and size of the nozzle.

Other ingredients are also commonly added to ink jet inks. A humectant, or cosolvent, is commonly added to help prevent the ink from drying out or crusting in the orifices of he printhead. A penetrant may also be optionally added to help the ink penetrate the receiving substrate, especially when the substrate is a highly sized paper. A biocide, such as Proxel® GXL from Zeneca Colours may be added at a concentration of 0.05–0.5 weight percent to prevent unwanted microbial growth which may occur in the ink over time. Additional additives which may optionally be present in ink jet inks include thickeners, conductivity enhancing agents, anti-kogation agents, drying agents, and defoamers.

The ink jet inks provided by this invention are employed in ink jet printing wherein liquid ink drops are applied in a controlled fashion to an ink receptive layer substrate, by ejecting ink droplets from the plurality of nozzles, or orifices, in a print head of ink jet printers Commercially available ink jet printers use several different schemes to control the deposition of the ink droplets. Such schemes are generally of two types: continuos stream and drop-on-demand.

In drop-on-demand systems, a droplet of ink is ejected from an orifice directly to a position on the ink receptive layer by pressure created by, for example, a piezoelectric device, an acoustic device, or a thermal process controlled in accordance digital data signals. An ink droplet is not generated and ejected through the orifices of the print head unless it is needed. Ink jet printing methods, and related printers, are commercially available and need not be described in detail.

The following examples illustrate the utility of the present invention.

EXAMPLE 1

An ink jet ink concentrate, according to this invention was prepared as follows. The following ingredients were blended in a 1 liter vessel for 24 hours and rolled at less than 60 rpm for 24 hours:
300 grams of poly(styrene-co-divinylbenzene)-20/80 beads (milling media), mean diameter of 50 µm;
204 grams de-ionized water (liquid carrier medium)
12.8 grams of sodium N-methyl-N-oleoyl taurate (OMT);
38.4 grams Sunfast Quinacridone Pigment (Pigment Red 122 obtained from Sun Chemical Corporation)

The resulting mixture was transferred to a cylindrical 1-L water-cooled vessel and agitated for 5 hours at high speed (9000 rpm) using a Cowles-type saw tooth impeller (40 mm diameter). At the end of 5 hours of milling, additional de-ionized water (42 g) and OMT (6.4 g) were added, and high speed mixing was resumed for 14 hours. An additional 3.4 g of OMT were added, and the milling resumed for 9 hours. At that time, deionized water was added to adjust the mixture to 10 weight % pigment, and the milling speed was reduced to less than 100 rpm for 12 hours. The milling media was separated from this mixture with a 15-µm filter.

COMPARATIVE EXAMPLE 1

A comparative ink jet ink concentrate was prepared using a conventional grinding mill loaded with 500-µm ceramic milling media. The 570-mL milling chamber of a Dyno Mill (manufactured by Willy A. Bachofen AG Maschinenfabrik Basel Switzerland) was loaded with 1148 g (485 mL) of zirconium silicate milling beads (SEPR media obtained from Quartz Products Corporation of Plainfield, N.J.) such that the effective volumetric loading was 85% of the available chamber volume. The following ingredients (920 g) were rolled at 60 rpm for 2 days:
13.5 weight % Sunfast Quinacridone 4.5 weight % OMT
82.0 weight % deionized water
20 ppm Proxel® GXL (biocide)

This resulting mixture was then pumped through the milling chamber (75 mL/min) such that the average residence time of the mixture in the milling zone was 120 minutes. The shaft speed of this mill was maintained at 3200 rpm throughout the milling cycle.

Particle Size

The particle size distributions of the ink concentrates of example 1 and comparative example 1 were measured using a Microtrac Ultra Fine Particle Analyzer (made by Leeds and Northoursup of Horsham, Pa). A diluted ink concentrate was introduced into the measurement chamber of the analyzer, and the following particle size data were gathered.

| | PARTICLE SIZE (nm) | | |
|---|---|---|---|
| Example No. | 10% less than | 50% less than | 90% less than |
| Comparative Example 1 | 45 | 94 | 200 |
| Example 1 (invention) | 9 | 12 | 26 |

These results show that the micromilling process of the present invention results in a much smaller particle size and a narrower particle size distribution than the prior art milling process presented in comparative example 1.

Ink Purity

The total trace-metal content of the two ink concentrates were determined using inductively coupled plasma atomic emission spectroscopy. Samples were prepared by digesting the ink concentrate in a mixture of sulfuric and nitric acids and dry ashing the digest in a muffle furnace. The dry residue was dissolved in hydrochloric and nitric acids, and the solution was measured for trace metals against matrix-matched standards. This method is commonly used for measuring trace metal contents. The following data indicates the level of trace metal contamination measured for aqueous slurries of 10.0 weight percent pigment. By trace metal contaminants we mean trace metals which were introduced by the milling process and not present in the raw ingredients.

| Trace Metal Contaminants (ppm) | | |
|---|---|---|
| | Comp. Ex. 1 | Ex. 1 (Invention) |
| Aluminum | 22 | 6.5 |
| Calcium | 32 | 31.7 |
| Cobalt | 0.7 | 0.5 |
| Chromium | 24 | 18.8 |
| Copper | 1.3 | 0.7 |
| Iron | 98 | 109 |
| Potassium | 14 | 19.8 |
| Manganese | 2.5 | 2.4 |
| Magnesium | 6.1 | 4.9 |
| Nickel | 17.5 | 12.9 |
| Silicon | 1120 | 53.5 |
| Zinc | 0.8 | 1.1 |
| Zirconium | 3570 | 0.7 |
| Total | 4908 | 262 |

The trace metal contamination of prior art comparative example 1 is about 19 times greater than that of the dye concentrate of invention example 1. High levels of ink purity are required to produce colloidally stable inks that have reliable keeping and ink jet printability properties up to at least two years using ink jet imaging technology. Excessive ionic content in pigmented ink-jet inks can destabilize the suspended colorant particles and prevent the inks from printing reliably and/or uniformly. Also, some ionic impurities can cause corrosion of the printhead that results in failure of the printing device.

Ink Performance

The ink concentrates from example 1 and comparative example 1 were both diluted to working strength ink jet inks having the following final composition:
2.5 weight % pigment;
5 weight % diethylene glycol;
5 weight % glycerol;
0.6 weight % poly[oxydeithylene-co-1,4-cyclohexyldimethylene (54/46) isophthalate-co-5-sodiosulfoisophthalate (80/20); and
balance -deionized water to 100 weight %

These inks were loaded into an empty Hewlett-Packard 51626A ink cartridge, and prints were prepared with a Hewlett-Packard DeskWriter® Model 550C ink jet printer. A test target was printed on medium weight Kodak Photographic Quality InkJet paper (Cat.# 885-9480), on Epson A4 Glossy White Film (Cat.# S041050) and on Epson transparent film (Cat.# S041030).

The reflection spectra of the Dmax areas of the test targets printed on the glossy paper and the white film were measured using a Macbeth Color Analyzer EYE 2145. The transmission spectra of the Dmax areas of the test targets printed on the transparent film were measured using a Perkin Elmer UV/VIS spectrophotometer, Model Lambda 6.

The transmission spectra of the working strength ink was measured by diluting the ink to 25 parts of pigment per million parts of water. This diluted ink was introduced into a 10 mL cuvette with a 1 centimeter path length. The visible spectrum (350–750 nm) of each diluted ink was measured on the spectrophotometer. A sample of distilled water was placed in the reference beam in order to factor out the absorption of the liquid phase.

The following observations and measurements compare Example 1 and Comparative Example 1.

INK PERFORMANCE DATA

| FEATURE | Comparative Example 1 | Example 1 |
|---|---|---|
| Ink Settling | Sediment visible after 1 week | No sediment visible after at least 3 months |
| Print Quality (Kodak Receiver) | Cracks, streaks | No visible cracks or streaks |
| Optical Density @ $\lambda_{max}$-reflection (Epson White Film) | 1.692 | 2.098 |
| Optical Density @ $\lambda_{max}$-transmission (Epson Transparent Film) | 0.919 | 1.383 |
| Optical Density @ $\lambda_{max}$-(diluted ink) | 0.654 | 0.711 |

These results show that pigmented ink jet inks (Example 1) prepared by the process of the present invention display surprisingly superior performance attributes relative to inks with identical composition but prepared from a prior art pigment milling process (comparative example 1).

The ink settling properties of the inks of the present invention are far superior to the inks prepared by the prior art process.

The print quality of images prepared with the ink of comparative example 1 exhibits significant cracking especially in the higher-density image areas using most commercially available receivers. These discontinuities seriously degrades image quality. This image degradation was not visible with inks of example 1.

The spectral absorption band of dispersed pigments is adversely broadened by the presence of large dispersed particles of colorants that contribute to light scattering. Pigmented inks prepared according to example 1 result in minimum light scattering. This produces a sharper spectral adsorption band that can expand the color gamut produced with a set of colorants. Hence inks prepared according to the process of the invention provide superior color gamut compared to inks processed according to comparative example 1.

Inks and ink concentrates were prepared and tested as described above in example 1. Tested pigments included copper phthalocyanine (pigment blue 15), Novaperm Yellow P-HG (pigment yellow 180), and carbon black (pigment black 7). The results of these tests were substantially the same as for example 1.

The invention has been described in detail with particular reference to preferred embodiments thereof, but it will be understood that variations and modifications can be effected within the spirit and scope of the invention.

We claim:

1. A process for making ink jet inks, comprising the steps of:
   (A) providing an organic pigment dispersion containing a pigment, a carrier for the pigment and a dispersant;
   (B) mixing the pigment dispersion with rigid milling media having an average particle size less than 100 μm;
   (C) introducing the mixture of step (B) into a high speed mill;
   (D) milling the mixture from step (C) until a pigment particle size distribution is obtained wherein 90% by weight of the pigment particles have a size less than 100 nanometers (nm);
   (E) separating the milling media from the mixture milled in step (D); and
   (F) diluting the mixture from step (E) to obtain an ink jet ink having a pigment concentration suitable for ink jet printers.

2. The process of claim 1 wherein the rigid milling media is polymeric milling media having an average diameter of 50 μm.

3. The process of claim 1 wherein the dispersant is a polymeric dispersant.

4. The process of claim 1 wherein the dispersant is sodium N-methyl-N-oleoyl taurate.

5. The process of claim 1 wherein the carrier is water.

6. The process of claim 5 wherein the carrier is de-ionized water.

7. The process of claim 1 wherein step (D) is carried out until 90% by weight of the pigments in the mixture have a particle size less than 50 nm.

8. The process of claim 1 wherein step (D) is carried out until by weight of pigments in the mixture have a particle size less than 15 nm; 50% by weight of said pigments have a particle size less than 25 nm and 90% by weight of said pigments have a particle size less than 50 nm.

9. The process of claims 7 or 8 wherein the organic pigment is selected from the group consisting of cyan, magenta, yellow, and black pigments or any mixture of two or more of such pigments.

10. An ink jet ink comprising organic pigment particles having a particle size of wherein 90% by weight of the pigment particles have a size less than 100 nanometers (nm).

11. An ink jet ink according to claim 10 having a surface tension in the range of 30 to 50 dynes/cm, a viscosity in the range of 1 to 5 centipoise, a pH in the range of 5 to 9 and a total trace metal contamination concentration of less than 100 parts per million of ink containing 2.5% by weight of pigment.

12. The ink of claim 10 wherein 90% by weight of the pigments in the ink have a particle size less than 50 nm.

13. An ink jet printing method, comprising the steps of:
   providing an ink jet printer that is responsive to digital data signals;
   loading the printer with ink receptive substrates;
   loading the printer with an ink jet ink comprising organic pigment particles wherein 90% by weight of the pigment particles have a size less than 100 nanometers (nm); and
   printing on an ink receptive element in response to the digital data signals.

14. The method of claim 13 wherein the ink jet ink has a surface tension in the range of 30 to 50 dynes/cm, a viscosity in the range of 1 to 5 centipoise, a pH in the range of 5 to 9 and a total trace metal contamination concentration of less than 100 parts per million of ink containing 2.5% by weight of pigment.

15. The method of claim 13 wherein 90% by weight of the pigments in the ink have a particle size less than 50 nm.

* * * * *